United States Patent [19]
Zou et al.

[11] Patent Number: 6,154,101
[45] Date of Patent: Nov. 28, 2000

[54] FAST SLEWING PSEUDORANDOM NOISE SEQUENCE GENERATOR

[75] Inventors: Qiuzhen Zou; Gilbert C. Sih, both of San Diego; Avneesh Agrawal, Sunnyvale, all of Calif.

[73] Assignee: Qualcomm Incorporated, San Diego, Calif.

[21] Appl. No.: 09/198,079

[22] Filed: Nov. 23, 1998

[51] Int. Cl.[7] .................................................. H03B 29/00
[52] U.S. Cl. .......................... 331/78; 375/200; 375/206; 708/250; 708/252; 708/254; 708/270; 708/273
[58] Field of Search .............................. 341/187; 331/78; 375/200, 206, 208; 364/717.01, 718.01, 717.5; 708/250, 252, 270, 273, 254

[56] References Cited

U.S. PATENT DOCUMENTS

| | | | |
|---|---|---|---|
| 4,776,012 | 10/1988 | Zscheile, Jr. et al. | 380/46 |
| 4,785,410 | 11/1988 | Hamatsu et al. | 364/717 |
| 4,864,525 | 9/1989 | Kurihara et al. | 364/717 |
| 4,866,735 | 9/1989 | Mori et al. | 375/1 |
| 5,103,459 | 4/1992 | Gilhousen et al. | 375/1 |
| 5,790,589 | 8/1998 | Hutchison, IV et al. | 375/200 |

*Primary Examiner*—Robert Pascal
*Assistant Examiner*—Kimberly Glenn
*Attorney, Agent, or Firm*—Philip R. Wadsworht; Tom Streeter; Charles D. Brown

[57] ABSTRACT

A novel and improved method and apparatus for a fast-slewing pseudorandom noise sequence generator is described. One or more loadable PN generators are controlled by a DSP or microprocessor in conjunction with a free-running counter which maintains a reference offset count. The PN generator will typically be part of a finger or searcher. The DSP or microprocessor may assist in other finger or searcher functions as well as the slew function, and can control one or more fingers and/or searchers. Each PN generator is comprised of a loadable linear feedback shift register (LFSR) or its equivalent, a loadable counter for maintaining an index of the state of that particular PN generator, and a slew control device capable of receiving a slew command and controlling the LFSR and index counter to enact an advance or a retard of a certain offset distance.

4 Claims, 6 Drawing Sheets

FAST SLEWING PSEUDORANDOM NOISE SEQUENCE GENERATOR

BACKGROUND OF THE INVENTION

I. Field of the Invention

The present invention relates to communications. More particularly, the present invention relates to a novel and improved method and apparatus for generating a pseudorandom noise (PN) sequence with the capability of being rapidly slewed from one offset to another.

II. Description of the Related Art

Pseudorandom noise (PN) sequences are commonly used in direct sequence spread spectrum communication systems such as that described in the IS-95 over the air interface standard and its derivatives such as IS-95-A and ANSI J-STD-008 (referred to hereafter collectively as the IS-95 standard) promulgated by the Telecommunication Industry Association (TIA) and used primarily within cellular telecommunications systems. The IS-95 standard incorporates code division multiple access (CDMA) signal modulation techniques to conduct multiple communications simultaneously over the same RF bandwidth. When combined with comprehensive power control, conducting multiple communications over the same bandwidth increases the total number of calls and other communications that can be conducted in a wireless communication system by, among other things, increasing the frequency reuse in comparison to other wireless telecommunication technologies. The use of CDMA techniques in a multiple access communication system is disclosed in U.S. Pat. No. 4,901,307, entitled "SPREAD SPECTRUM COMMUNICATION SYSTEM USING SATELLITE OR TERRESTRIAL REPEATERS", and U.S. Pat. No. 5,103,459, entitled "SYSTEM AND METHOD FOR GENERATING SIGNAL WAVEFORMS IN A CDMA CELLULAR TELEPHONE SYSTEM", both of which are assigned to the assignee of the present invention and incorporated by reference herein.

FIG. 1 provides a highly simplified illustration of a cellular telephone system configured in accordance with the use of the IS-95 standard. During operation, a set of subscriber units 10a–d conduct wireless communication by establishing one or more RF interfaces with one or more base stations 12a–d using CDMA modulated RF signals. Each RF interface between a base station 12 and a subscriber unit 10 is comprised of a forward link signal transmitted from the base station 12, and a reverse link signal transmitted from the subscriber unit. Using these RF interfaces, a communication with another user is generally conducted by way of mobile telephone switching office (MTSO) 14 and public switch telephone network (PSTN) 16. The links between base stations 12, MTSO 14 and PSTN 16 are usually formed via wire line connections, although the use of additional RF or microwave links is also known.

Each subscriber unit 10 communicates with one or more base stations 12 by utilizing a rake receiver. A RAKE receiver is described in U.S. Pat. No. 5,109,390 entitled "DIVERSITY RECEIVER IN A CDMA CELLULAR TELEPHONE SYSTEM", assigned to the assignee of the present invention and incorporated herein by reference. A rake receiver is typically made up of one or more searchers for locating direct and multipath pilot from neighboring base stations, and two or more fingers for receiving and combining information signals from those base stations. Searchers are described in co-pending U.S. patent application Ser. No. 08/316,177, entitled "MULTIPATH SEARCH PROCESSOR FOR SPREAD SPECTRUM MULTIPLE ACCESS COMMUNICATION SYSTEMS", filed Sep. 30, 1994, assigned to the assignee of the present invention and incorporated herein by reference. Searchers and fingers must be capable of generating the proper PN sequences to match those generated at the base station. PN sequences are typically generated through the use of linear feedback shift registers, or LFSRs.

Inherent in the design of direct sequence spread spectrum communication systems is the requirement that a receiver must align its PN sequences to those of the base station. Each base station and subscriber unit uses the exact same PN sequences. A base station distinguishes itself from other base stations by inserting a unique offset in the generation of its PN sequences. In IS-95 systems, all base stations are offset by an integer multiple of 64 chips. A subscriber unit communicates with a base station by assigning at least one finger to that base station. An assigned finger must insert the appropriate offset into its PN sequence in order to communicate with that base station. Moving an LFSR from one offset to another is known as slewing. One method of slewing is to temporarily speed up the rate of change of states of the LFSR. This is known as an advance, since it moves the sequence forward relative to the base station sequence. Another method of slewing is to temporarily slow down the rate of change of states of the LFSR. This is known as a retard, since it moves the sequence back relative to the base station sequence.

A typical prior art LFSR configuration is shown in FIG. 2. The elements in this configuration would be among those required in a typical finger or searcher. LFSR 210 generates signal LFSR_STATE which embodies the PN sequence needed for searching or demodulation (in circuitry not shown). IS-95 systems require two LFSRs: one for the I channel and one for the Q channel.

Each of those LFSRs differs slightly from a textbook LFSR in that the number of states is increased from $2^{15}-1$ to $2^{15}$ by the inclusion of what is known as a stuff state. The exact nature of the PN sequence generated by an LFSR is determined by the polynomial chosen, which is implemented by the configuration of tap positions. The slewing function is not substantially affected by the inner workings of LFSR 210. For purposes of this example, LFSR 210 simply moves from one state to the next in its pre-defined sequence whenever LFSR_EN is asserted, and it remains in its current state whenever LFSR_EN is not asserted.

LFSR_EN is generated by slew control 200. When the LFSR is not slewing, LFSR_EN will be active once per chip period, so that LFSR_STATE will generate a new state at the chip rate. When signal SLEW_COMMAND is received from a controlling microprocessor, DSP, or discrete hardware (not shown) which indicates that the offset needs to be changed, slew control 200 adjusts the timing of LFSR_EN to enact the offset change.

Counter 220 is also controlled by LFSR_EN. It is used to keep track of which state the LFSR is in by generating an index which is labeled LFSR_COUNT. All of the components are reset by a common reset, which aligns LFSR_COUNT and LFSR_STATE to predetermined positions. Since LFSR_EN controls both counter 220 and LFSR 210, and both either advance together or don't advance at all, LFSR_COUNT can be used to determine where LFSR_STATE is in the PN sequence.

FIG. 3 shows a conceptual timing diagram which illustrates an advance slew. Signal chip_clk depicts the chip rate. Signals BS1 and BS2 represent the PN sequences of two different base stations. Each sequence advances through the same sequence of states, labeled S0, S1, . . . , but as described above the base stations are distinguishable based on the offset between their respective PN sequences. The offset shown in this example is only 2 chips. As stated above, IS-95 base stations are always offset by integer multiples of 64 chips. The offsets chosen have no material effect on slewing functionality. Signal LFSR represents the state of the LFSR which would exist inside a finger or searcher in a subscriber unit. It is shown intially to be aligned with BS1. While communicating with (or searching for) BS1, LFSR_EN will assert once per chip period and LFSR will remain aligned with BS1. The following description will demonstrate how the LFSR can be slewed to align with BS2. Based on the relative positions of LFSR, BS1, and BS2, this will be accomplished by an advance of two chips. The first advance is labeled advance1. An additional LFSR_EN assertion is made while LFSR is in S2. This causes LFSR to advance to S3 while BS1 is still in S2. The expected LFSR_EN then comes along and advances LFSR to S4. Note that BS2 is in S5 and BS1 is in S3, so this LFSR (and hence its finger or searcher) is not aligned with and hence not in communication with either base station. The second advance, labeled advance2, occurs when an additional LFSR_EN assertion occurs while LFSR is in S4. This causes LFSR to advance to S5, where it is now aligned with BS2. The following LFSR_EN assertions occur at the chip rate, so LFSR remains aligned with BS2.

FIG. 4 shows a conceptual timing diagram which illustrates a retard slew. The signals represent the same signals and states described above for an advance. The difference here is that LFSR is going to be slewed from BS2 alignment to BS1 alignment. This will require a retard of two chips. Instead of extra LFSR_EN assertions which speed up the rate of change of LFSR (used for an advance), some of the LFSR_EN assertions will be omitted. The omissions (dashed assertions are shown where the assertion would have been) are labeled retard1 and retard2, and cause LFSR to remain in S3 while BS2 continues on through S4 to S5. Meanwhile BS1 proceeds from S1 to S3. When LFSR_EN begins asserting again at the regular chip rate, LFSR will be aligned with BS1.

The LFSRs in fingers must be slewed in several situations during normal communications. One situation occurs when finger assignment is performed: each finger must be assigned to a position where a searcher located a pilot. Short slews may be performed when a finger assigned to a multipath signal is reassigned to a stronger nearby multipath signal. More generally though, LFSRs will have to be slewed over large offsets. Fingers may be reassigned from one base station to neighboring base stations located at large offsets from the first. After a subscriber wakes up from a power-conserving sleep mode, fingers will generally need to be relocated. In most situations, it will be advantageous to minimize the time required to slew a finger since during slewing a finger is not useful for communications. The examples given above represent slewing capability of advancing or retarding one chip per chip period. Using IS-95 as an example, the maximum time required to slew is half of the PN circle, or 13.33 ms. Fingers and searchers with increased slew speed will be advantageous for a variety of reasons including those given above.

SUMMARY OF THE INVENTION

A novel and improved method and apparatus for a fast-slewing pseudorandom noise sequence generator is described. One or more loadable PN generators are controlled by a DSP or microprocessor in conjunction with a free-running counter which maintains a reference offset count. The PN generator will typically be part of a finger or searcher. The DSP or microprocessor may assist in other finger or searcher functions as well as the slew function, and can control one or more fingers and/or searchers. Each PN generator is comprised of a loadable linear feedback shift register (LFSR) or its equivalent, a loadable counter for maintaining an index of the state of that particular PN generator, and a slew control device capable of receiving a slew command and controlling the LFSR and index counter to enact an advance or a retard of a certain offset distance.

The speed increase is effected by DSP control. A table of LFSR states and corresponding index numbers are stored in memory. These LFSR states will subdivide the total possible number of possible states. It is advantageous to evenly space the stored states around the PN circle. The fast slewing is enabled by the DSP in a two-step process. First the PN generator is loaded such that it "jumps" to the closest state using the table, then the PN generator's slew control is used to slew the rest of the way.

When a finger is to be slewed to a particular offset, the position determined by adding that offset to the current value of the free-running reference counter is calculated. The nearest location and the corresponding LFSR state are retrieved from the table. Simultaneously, the index is loaded into the particular finger's counter and the LFSR state is loaded into the particular finger's LFSR. Once the LFSR and counter have been loaded, they have effectively "jumped" to a position very near to the one retrieved from the table, with some imprecision due to the processing time required to perform the steps above. The DSP then simultaneously reads the PN generator's counter value and the free-running reference counter value to determine the new current offset. The current offset is subtracted from the desired offset. The difference determines the remaining offset adjustment required. The remaining adjustment is carried out by a slew command sent to the PN generator slew control to cause an advance or retard to bring the PN generator to the exact offset desired.

The speed increase is proportional to the number of PN states stored in the DSP. The time to slew to any location (note that the prior state of the PN generator is not used) is determined by the total number of PN states divided by the number of states stored in the DSP multiplied by the slew rate of the slew control (if the locations of the stored states are equally spaced).

This method is in contrast to the prior art, where a finger would be directly slewed from its current offset to a desired new offset directly by a slew command to the slew control. Since typical slew rates were on the order of one chip per chip for advances and retards, a slew to a distant location on the PN circle would take quite a long time. On average, a slew would be half the PN circle. Since typically a slew can go in either direction, advance or retard, the average slew is ¼ the PN circle, and so the corresponding average slew time would be this number of states divided the slew rate.

In the exemplary embodiment, there are $2^{15}$ possible states. The DSP stores 16 PN states and corresponding index values which are evenly spaced around the PN circle (2048 chips apart). The exemplary PN generator can slew at a rate of 7 chips per chip time while advancing, or 1 chip per chip time while retarding. The maximum slew time is then 256 chip times plus the time it takes the DSP to cause the jump. Any location in any 2048 chip span can be reached within 256 chips by jumping to the nearest stored location before it and advancing at a rate of 7 chips per chip or jumping to the nearest stored location behind it and retarding at a rate of 1 chip per chip. Contrast this with the prior art method of an average of 2^13 chip times. By increasing the state storage by a factor of two, the maximum slew span decreases to 1024 and the maximum slew time decreases by a factor of two also (ignoring the small amount of DSP processing time).

This technique can be used for a wide variety of PN sequences. Storage space in the DSP can be traded for increased slew speed as necessary. The exemplary LFSR, counter and slew control work well with the present invention, but this technique is not limited to this configuration. Any loadable sequence generator coupled with a slew control device can be configured in accordance with the present invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 5:
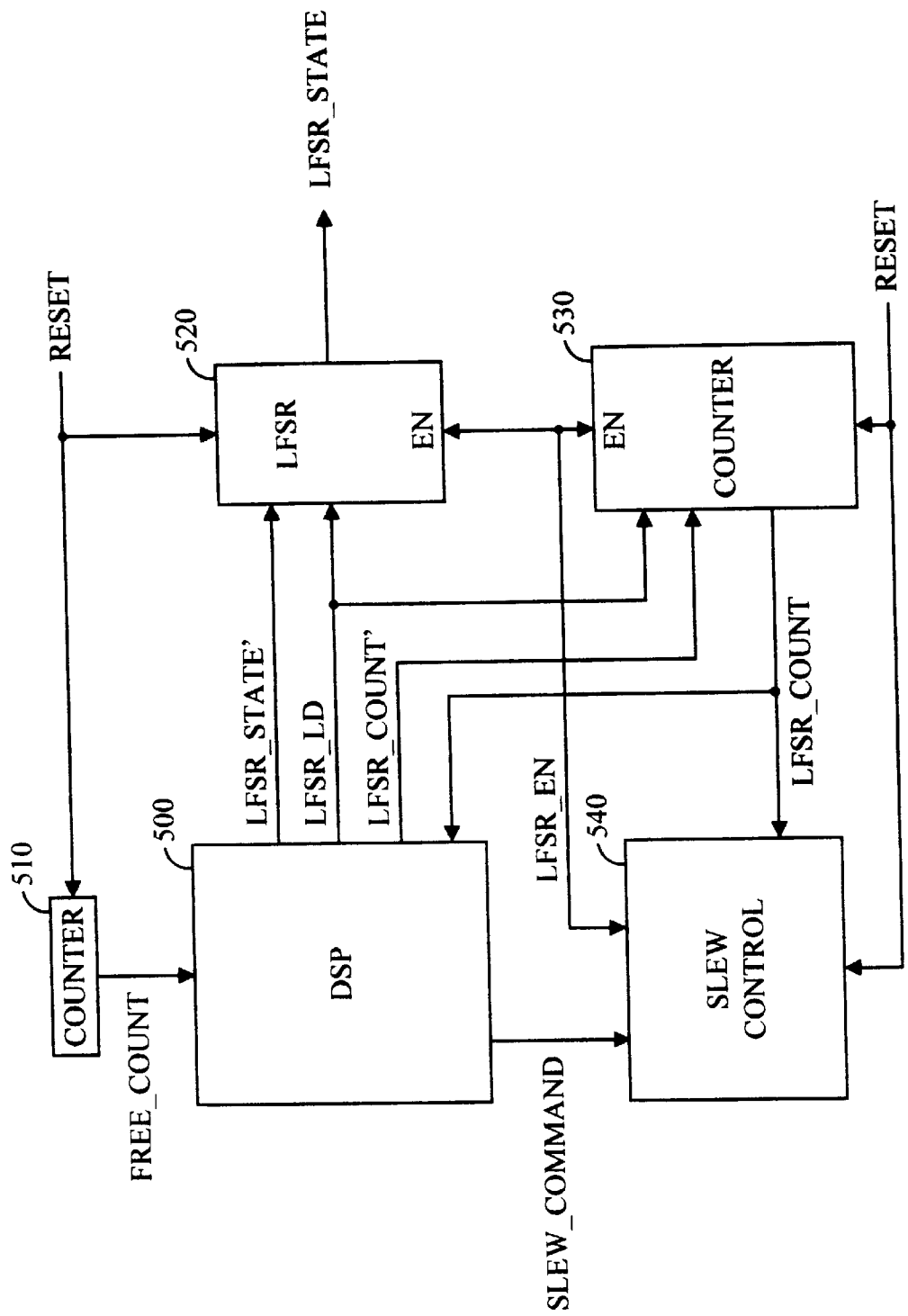
FIG. 5 is a block diagram configured in accordance with the exemplary embodiment of this invention.

A block diagram configured in accordance with the present invention is shown in FIG. 5. LFSR 520, counter 530, and slew control 540 represent functions relating to the present invention which will be present for PN generation in a finger, searcher, or combination finger/searcher. It is not necessary for a full description of the present invention to describe the entire finger or searcher. In the following discussion, reference is made only to fingers, although it will be clear to those skilled in the art that PN generation and slewing techniques can be applied to both fingers and searchers. In the exemplary embodiment, these elements are connected to DSP 500. For the sake of simplicity, and with no loss of generality, only elements of a single finger are shown, but in practice several fingers will be connected to DSP 500. In the exemplary embodiment there will be four fingers. In the exemplary embodiment, DSP 500 is used in conjunction with fingers and searchers to perform portions of those tasks in addition to slewing. This is not a requirement, but when the DSP is already coupled to the fingers the present invention can be practiced with the additional benefit of low additional cost. DSP 500 is also connected to counter 510. This counter is not specifically related to any single finger, but is used in conjunction with all of them. There need only be one such counter, regardless of how many fingers are employed.

Upon initialization of a demodulator utilizing the present invention, a reset signal is used to align the output of LFSR 520, LFSR_STATE, with the appropriate index value which is contained in counter 530, LFSR_COUNT. Since, as described above, different base stations are isolated via unique offsets in the common PN sequence shared by all devices communicating in a CDMA system, it is important that there be a common one-to-one matching between LFSR_STATE and LFSR_COUNT. The same reset signal will reset counter 510, whose output, FREE_COUNT, will be used as a common reference. The reset is used for other initialization purposes as well. For example, it is convenient to reset slew control 540.

Counter 510 will serve as a time reference. Its output, FREE_COUNT, counts through the number of states in the PN sequence (2^15 in the exemplary embodiment) at a rate of one state per chip period. Note that no enable signal attaches to this counter; it is free running. It is not a requirement that FREE_COUNT be aligned exactly with any particular PN sequence counter in the system. It is sufficient that FREE_COUNT updates at a rate of once per chip and hence maintains a constant offset in relation to the system as a whole. Once communication has been established with a base station, that base station can inform the subscriber unit which particular offset the base station is using in its PN sequence generation. From this information, the difference between FREE_COUNT and the actual system PN phase can be calculated and factored into any future offset calculations. FREE_COUNT is connected to DSP 500 for use in such calculations.

LFSR 520 generates an output, LFSR_STATE, from which a PN sequence can be generated for use in demodulation (not shown). In the exemplary embodiment, two LFSRs will be employed: one for the I channel and one for the Q channel. This is not a requirement for practicing the present invention. The LFSR will advance one state in the PN sequence once during every clock cycle in which LFSR_EN is active. Correspondingly, since it serves as an index for LFSR_STATE, LFSR_COUNT will update to reflect the current LFSR_STATE. LFSR_EN is generated by slew control 540. In steady state, LFSR_EN will assert once per chip, as described above. LFSR_EN can be asserted at a higher rate to accomplish an advance slew, or can be withheld to accomplish a retard slew. Slew control 540 generates LFSR_EN in accordance with a signal, SLEW_COMMAND, given to it by DSP 500. SLEW_COMMAND will indicate to slew control whether to advance or retard, and by how many chips. In FIG. 5, LFSR_COUNT is shown to connect to slew control 540. In some implementations of slew control devices, the current index of the LFSR is used. This is not a requirement. The performance of the present invention is not contingent upon any one particular implementation of slew control. The only requirement is that the DSP 500 can issue a SLEW_COMMAND to slew control 540 and the appropriate offset will subsequently be introduced into LFSR_STATE and the accompanying index LFSR_COUNT.

Figure 1:
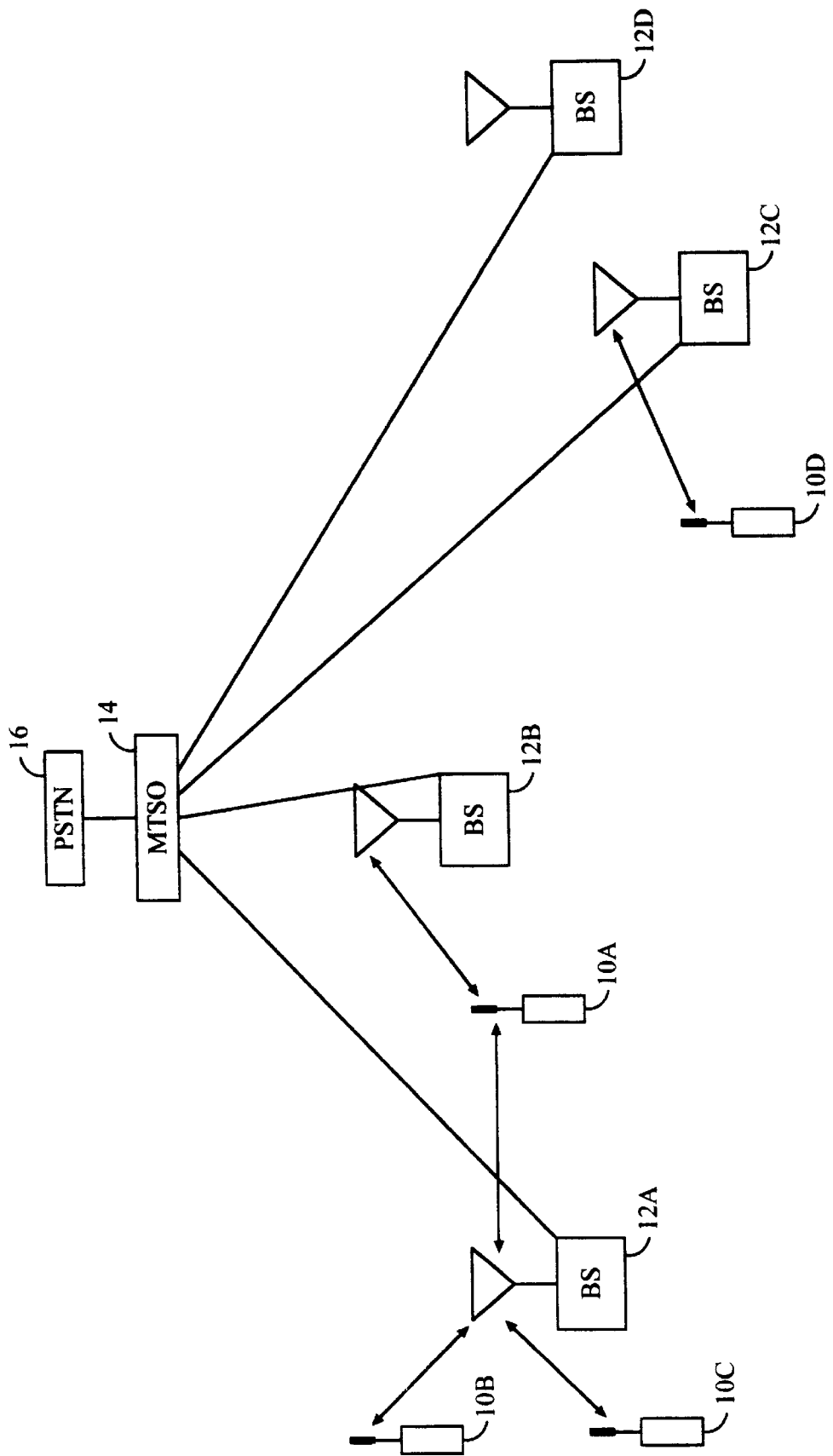
FIG. 1 is a block diagram of cellular telephone system.
Figure 2:
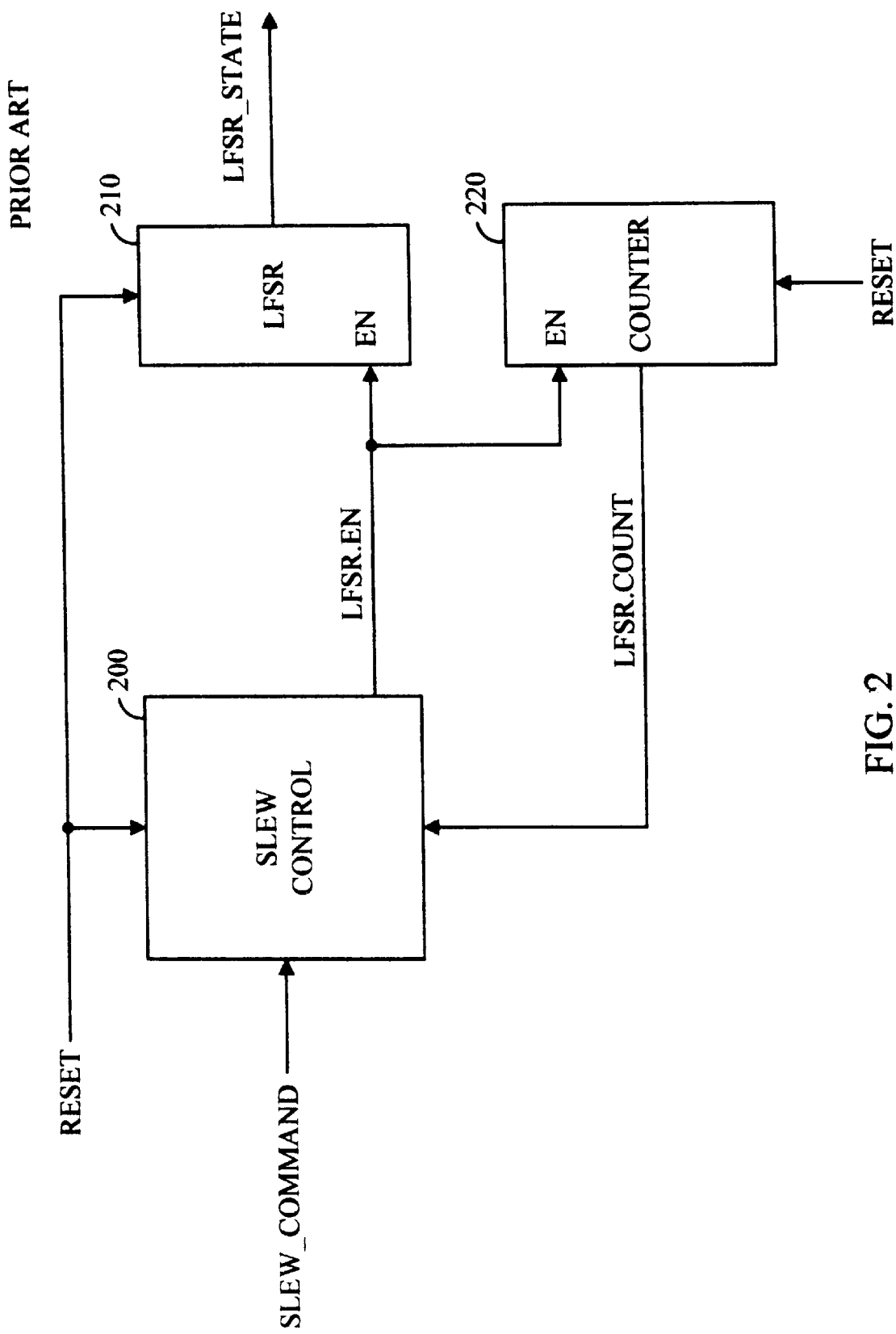
FIG. 2 is a block diagram of a prior art PN generator.
Figure 3:
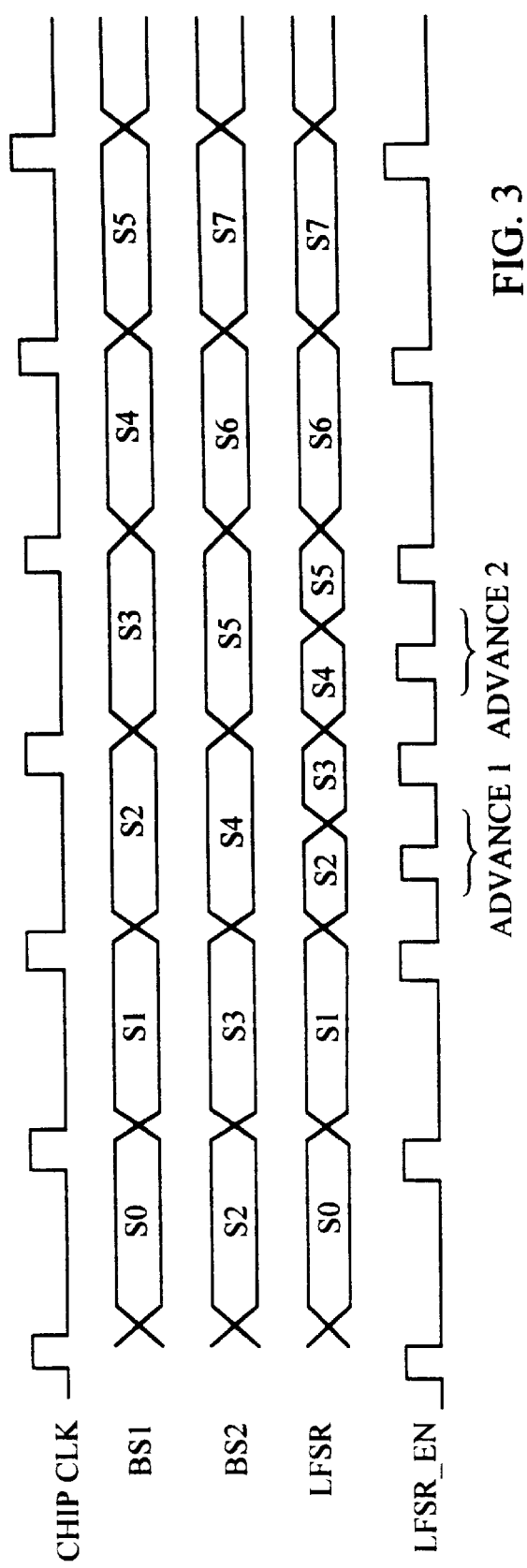
FIG. 3 is a timing diagram depicting a typical PN generator advance.
Figure 4:
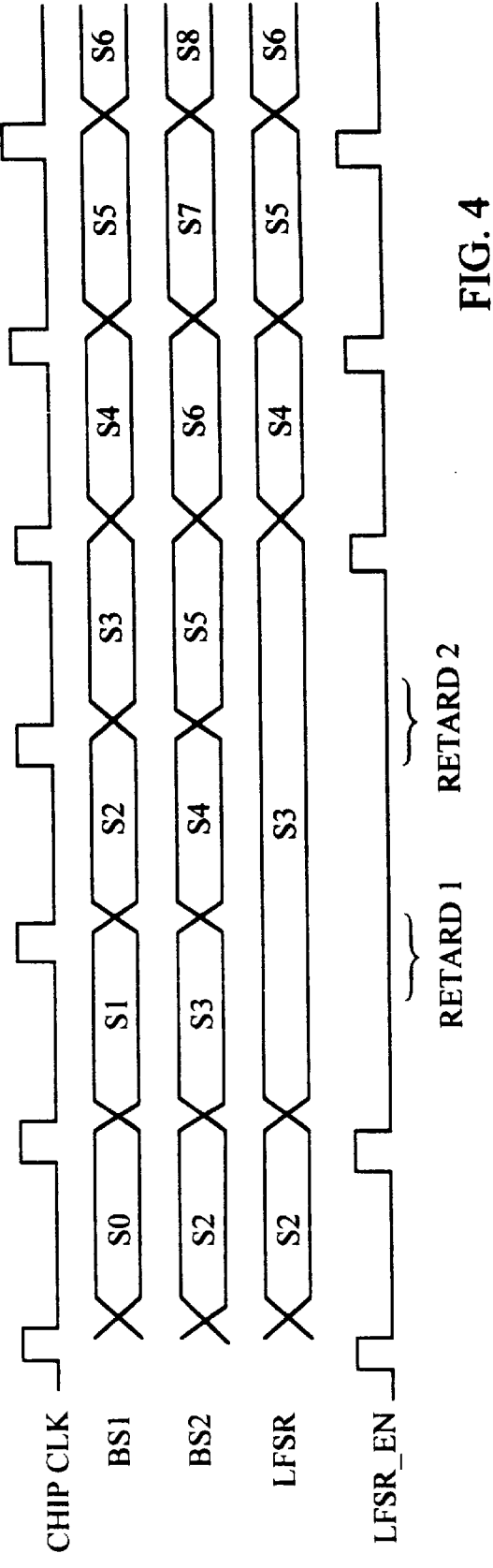
FIG. 4 is a timing diagram depicting a typical PN generator retard.
Figure 6:
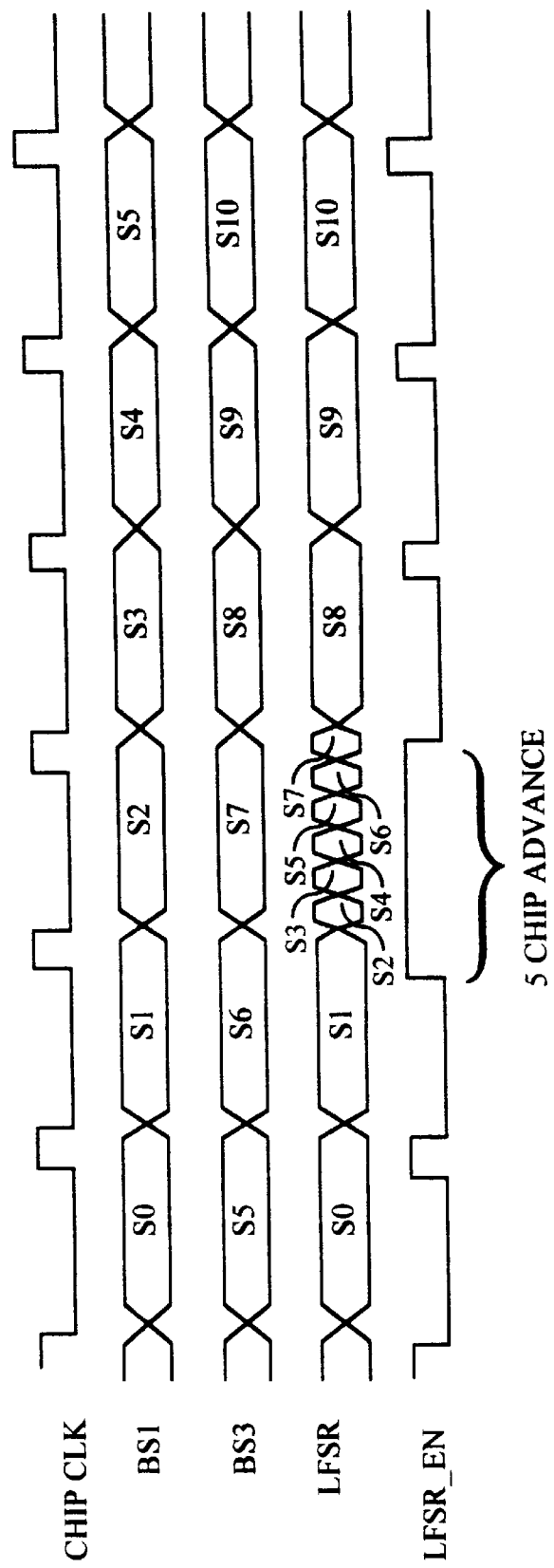
FIG. 6 is a timing diagram depicting a faster PN generator advance.

FIG. 6 depicts a timing diagram of a more rapid advance slew than the one described in the discussion of prior art above. Similar to the discussion regarding FIGS. 3 and 4, BS1 and BS3 represent the index of the PN sequence used by two different base stations in communication with a subscriber unit whose PN sequence index is shown by LFSR. Note that BS3 is offset by five chips from BS1. The clock rate controlling LFSR is six times the chip rate. (This example is for demonstration, the exemplary embodiment employs a clock of eight times the chip rate, and, as specified by IS-95, all base stations are multiples of 64 chips apart.) Initially, LFSR is aligned with BS1. It advances in sequence once per chip, as indicated when LFSR_EN is asserted. For this configuration, a maximum advance of five chips per chip can be accomplished, and is shown by the portion of LFSR_EN labeled "5 Chip Advance". Here LFSR_EN is asserted for an entire chip period. The LFSR state increments once per clock cycle. When not slewing, the LFSR should update once per chip period, here it updates six times. Hence, LFSR has advanced by five offsets and is now aligned with BS3. In general, an LFSR being clocked by the chip rate times some integer N can be advanced at a rate of N−1 chips per chip period. In the exemplary embodiment, advances of seven chips per chip period are possible. Retards are still accomplished at the one chip per chip period rate, as described in the discussion of FIG. 4 above. These numbers are illustrative of the exemplary embodiment. The features of the present invention are not impaired if slower or faster stewing is accomplished by slew control 540 in response to a SLEW_COMMAND from DSP 500, although the maximum slew time to any position in the PN circle will be based on these numbers.

LFSR 520 is also connected to DSP 500 for the purpose of loading a value, LFSR_STATE', when a load signal, LFSR_LD, is asserted. Similarly, LFSR_LD connects to counter 530 to load a value, LFSR_COUNT', into counter 530. Note that the output of counter 530, LFSR_COUNT, which is the index value of LFSR_STATE is also connected to DSP 500. LFSR_STATE is not needed by DSP 500, since its position information is contained in LFSR_COUNT and steps are taken to insure that LFSR_STATE and LFSR_COUNT remain properly aligned. The prior art counters and LFSRs described above did not require the ability to load. A simple reset which aligned them was sufficient, and slewing was accomplished by a slew control block similar to slew control 540 which could adjust their offsets to any arbitrary position. As discussed above, however, to slew to any arbitrary position in the PN circle can take a substantial amount of time.

Figure 7:
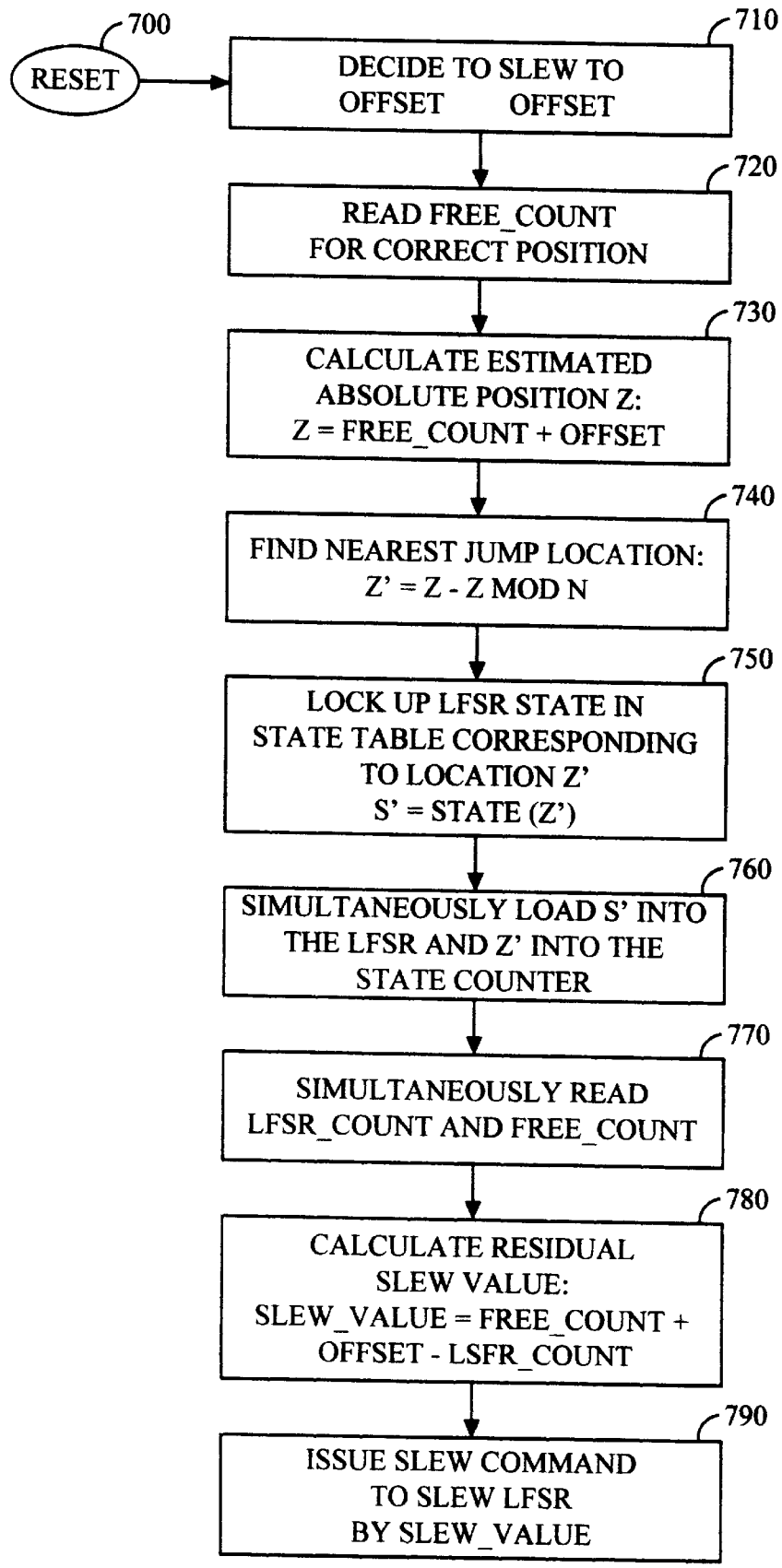
FIG. 7 is a flow diagram detailing the steps to perform the present invention.

The configuration of DSP 500, LFSR 520, counter 530, and slew control 540, as shown in FIG. 5, does not preclude the use of old-style chip per chip slewing as described above. However, a vast improvement in slew time can be accomplished with the use of the load feature of LFSR 520 and counter 530, in conjunction with counter 510 and some additional steps performed in DSP 500. The general procedure for fast slewing is outlined in the Summary of Invention section above. FIG. 7 shows a flow chart of the steps to accomplish fast slewing. Those steps are detailed in the discussion below.

The procedure begins in block 700 with a reset to align LFSR_STATE with LFSR_COUNT, and set FREE_COUNT to its initial value. It is not important whether or not FREE_COUNT and LFSR_COUNT are aligned upon initialization. Remember that in the exemplary embodiment there will be multiple fingers, and the following steps can be carried out with any of the variety of fingers available. For simplicity, all references in the following steps are made with respect to a finger which is the target of the slew.

In block 710, a decision is made to slew the finger to an offset, labeled OFFSET. This offset is calculated in reference to the local offset determined by FREE_COUNT. There are a variety of reasons to slew a finger. It may be the case that the subscriber unit is attempting acquisition, meaning it is not currently in communication with a base station. A search performed of all or part of the PN circle has returned certain candidate offsets where base stations are potentially located. In this case the offset can be calculated from the values of the index counter in the searcher and FREE_COUNT. The difference will determine OFFSET. Perhaps a mobile subscriber unit is in communication with a base station which gives the offset locations for neighboring base stations. In this case the base station may give the offset relative to the overall system, which may or may not be aligned with FREE_COUNT as discussed above. The proper offset can be calculated by comparing the system offset of the base station and comparing that with the difference between FREE_COUNT and the LFSR_COUNT of the finger communicating with that base station. For the purposes of this discussion OFFSET is calculated relative to the subscriber unit time reference, as contained in FREE_COUNT.

Proceed to block 720 and read the value of FREE_COUNT. FREE_COUNT is the output of counter 510 which maintains a reference index which cycles through the total number of PN states ($2^{15}$ in the exemplary embodiment). Since the counter updates once per chip period, and the chip period is known, the counter output can also be used as a time reference. A snapshot of the current position is needed by DSP 500. Implementation details of how to transfer the FREE_COUNT data to DSP 500 will vary based on which type of DSP is used and the width of the bus with which it communicates. In circumstances where multiple reads must be performed to transfer all of the bits of FREE_COUNT into the DSP, those skilled in the art will know a variety of ways to accomplish the task without a concurrent change in FREE_COUNT corrupting the data. One method is to capture the value in a register which is not updated until the read is completed. This allows FREE_COUNT to continue unhampered, as is required by the invention. The fact that the snapshot may be slightly old by the time it arrives in DSP 500 is not important.

Proceed to block 730, where DSP 500 calculates the estimated desired position, Z, which if loaded into counter 530 would cause it to be at the offset, labeled OFFSET, from FREE_COUNT: Z=FREE_COUNT+OFFSET.

Subsequently, in block 740, DSP 500 calculates the nearest jump location, Z'. The jump location must be selected out of a table of values stored in the DSP memory. The table will contain index values for loading into counter 530 and corresponding LFSR states for loading into LFSR 520. When these values are loaded, the LFSR will have effectively "jumped" to that state. Jumping is really an instantaneous slew, but is different than the type of slewing carried out by slew control 540, so a different term is used here.

In general, it is advantageous to select the jump locations to optimize for the shortest maximum slew time, which corresponds to selecting locations evenly spaced around the PN circle. Other choices for jump locations can be made, and then the maximum slew time will be a function of the largest distance on the PN circle between two stored jump locations. For certain distributions of actual base station offsets in a system, this type of spacing, while increasing maximum slew time, may lower average slew time. Myriad varieties of spacing patterns are foreseeable and fall within the scope of the present invention.

Another consideration is the tradeoff between memory storage requirements and slew speed. As will become clear in the following steps, if one is willing to store all the states in memory then slewing to any location can be virtually instantaneous. Storing only two states will cut the peak slewing time by factor of 2. Storing 4 states will cut peak slewing time by a factor of 4, and so on. In the exemplary embodiment, as mentioned previously, 16 states are stored in the table, equally spaced 2048 chips apart on the $2^{15}$ chip PN circle.

To determine the nearest optimal jump location requires knowledge of the advance and retard slew rates of slew_ control 540. If, for example, single chip per chip time is the rate of both advance and retard stewing, then Z' can simply be calculated by rounding to the nearest jump location. Then a retard slew command can be issued if Z<Z' and an advance slew command can be issued if Z>Z'. (The slew command step is described below with respect to block 790). If, in an alternate example, the advance rate is greater than the retard rate, simple rounding will not be optimal. Using the exemplary embodiment, the LFSR can advance slew 1792 chips in the amount of time it would take to retard slew 256 chips. Therefore Z' should be found such that Z−1792<Z'<Z+256. In this case any location in the 2048 span can be reached by advancing from a jump location at 7 chips per chip period, or retarding from the next higher jump location at 1 chip per chip period. FIG. 7 shows another alternative, which is not optimal but is simpler to calculate. Simply find the nearest jump location smaller than Z and advance from there to Z, since advancing is the fastest method of slewing. In this case Z'=Z−ZmodN, where N is the total number of chips divided by the number of jump locations (assuming equal spacing). In the exemplary embodiment N=$2^{15}$/16=2048. Those skilled in the art will see that any of these jump location procedures can be easily performed in DSP 500; the equation shown in block 740 is exemplary only.

In block 750, DSP 500 retrieves from the table the LFSR state, S', which corresponds to the index value determined by jump location Z': S'=State(Z'); where State represents the state table containing LFSR states indexed by jump locations.

Proceed to block 760 where DSP 500 presents S' on LFSR_STATE' and Z' on LFSR_COUNT' and simultaneously loads them into LFSR 520 and counter 530 by asserting the signal LFSR_LD. Analogous to the issues involved with reading FREE_COUNT on a bus smaller in bit width than FREE_COUNT are issues writing LFSR_STATE' and LFSR_COUNT'. Known in the art are a variety of ways to solve this. Disabling the counter and LFSR while various portions are bank loaded is one alternative. Bank loading a register then enabling a load into counter 530 and LFSR 520 is another. The implementation details are not crucial—what is required is that once the load operation is complete LFSR_STATE and LFSR_COUNT must be properly aligned. Remember that LFSR_COUNT is simply an index which identifies with sequential numbers the states through which LFSR_STATE is cycling. It is mandatory that LFSR_COUNT be an accurate reference to LFSR_STATE. This requirement is easily met by anyone with basic skill in the art.

Proceed now to block 770. Simultaneously read LFSR_COUNT and FREE_COUNT into DSP 500. DSP 500 will use these values to determine the current offset following the completed jump. It is important that the two counter output values be read at the same time. A typical way to accomplish this is to have the values loaded into registers in one clock cycle, then DSP 500 can perform as many read operations as required to load in the entire values.

In block 780, DSP 500 calculates the residual slew value: slew_value=FREE_COUNT+OFFSET−LFSR_COUNT. Nominally the residual slew value would be the absolute position Z minus the nearest jump location Z'. This is the amount of slew not accomplished during the jump. In addition, there was some time spent by DSP 500 in performing the steps described above. During this time FREE_COUNT advanced by some amount which was not included in the original calculation of Z. The description of block 740 above discussed the residual slew amounts based on a variety of jump location selection procedures. While those calculated residual slew values are useful for planning purposes, they are not needed in carrying out the steps of the present invention. Slew_value as calculated with a new reading of the offset between LFSR_COUNT and FREE_COUNT contains all the information required to complete the slew to the desired offset, labeled OFFSET.

Another minor optimization for minimizing slew time would be to calculate the average number of chips that FREE_COUNT advances while the DSP is processing the jump and add that number to the Z calculation. During most slews this will not have any effect since the residual slewing is performed by slew control 540, but occasionally the additional value will cause a more optimal jump location to be selected, so the maximum slew time will be reduced.

Finally, proceed to block 790. Here DSP 500 issues a command on SLEW_COMMAND to slew control 540 to slew LFSR 520 and counter 530 by the amount contained in slew_value. SLEW_COMMAND will designate whether to advance or retard and by how many chips to do so. After slew control 540 completes the task initiated by SLEW_COMMAND, the PN sequence generated via LFSR_STATE will contain the exact offset as determined in block 710.

Thus, a method and apparatus for a fast-slewing pseudo-random noise sequence generator has been described. The description is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A fast slewing PN sequence generator comprising:

a DSP;

a loadable LFSR for producing PN states and for receiving load values from said DSP;

a loadable index counter for providing an index of said LFSR states and for receiving load values from said DSP;

a controllable slew control for adjusting rate of state change in said loadable LFSR and correspondingly in said loadable index counter in response to commands from said DSP;

a reference counter for providing a reference state to said DSP; and a state table for storing a subset of PN states and their corresponding index values capable of being retrieved by said DSP.

2. The fast slewing PN sequence generator of claim 1 wherein fast slewing to a desired offset is carried out by said DSP in steps comprising:

a) determining load values from said state table for simultaneously loading into said loadable LFSR and said loadable index counter based on said reference state and said desired offset;

b) simultaneously loading said load values;

c) determining a residual slew value from the resultant offset and the desired offset; and d) commanding said controllable slew control to produce said desired offset by performing slewing based upon said residual slew value.

3. A method for performing fast slewing PN generation comprising the steps of:

a) finding an index value and a corresponding PN generator state in a state table based upon a desired offset and a reference state value;

b) simultaneously loading a PN generator with said PN generator state and said index value;

c) performing any required residual slew based upon current readings of said reference state value and said PN generator index values.

4. A method for performing fast slewing PN generation comprising the steps of:

a) determining a desired offset;

b) reading a reference state;

c) calculating an estimated absolute state position by adding said desired offset to said reference state;

d) finding a nearest index value contained in a state table;

e) retrieving an LFSR state corresponding to said nearest index value from said state table;

f) simultaneously loading said nearest index value into an index counter and said LFSR state into an LFSR;

g) simultaneously reading an updated reference state and the current index of said index counter;

h) calculating a residual slew value by summing difference said updated reference state added and said desired offset and subtracting from that sum said current index; and i) directing a slew control to perform said residual slew.

* * * * *